United States Patent [19]

Pontone

[11] 4,298,298

[45] Nov. 3, 1981

[54] REUSABLE WALL FASTENER

[76] Inventor: Louis J. Pontone, 935 E. 32nd St., Brooklyn, N.Y. 11210

[21] Appl. No.: 146,527

[22] Filed: May 5, 1980

[51] Int. Cl.[3] .................... F16B 35/04; F16B 37/00
[52] U.S. Cl. .................................. 411/342; 411/346; 411/409
[58] Field of Search ............... 411/341, 342, 340, 346, 411/409, 371–374; 24/211 P, 211 R

[56] References Cited

U.S. PATENT DOCUMENTS

| | | | |
|---|---|---|---|
| 309,817 | 12/1884 | Barton | 411/374 X |
| 1,168,257 | 1/1916 | Kennedy | 411/346 |
| 1,694,494 | 12/1928 | Tomkinson | 411/342 |
| 2,609,723 | 9/1952 | Stubbs | 411/340 |
| 2,682,190 | 6/1954 | Snyder | 411/346 |
| 2,897,694 | 8/1959 | Carney | 411/341 |
| 3,127,807 | 4/1964 | Modrey | 411/340 |
| 3,927,597 | 12/1975 | Stults et al. | 411/341 |
| 4,047,462 | 9/1977 | Hurtig | 411/340 |
| 4,196,883 | 4/1980 | Einhorn et al. | 411/340 X |

*Primary Examiner*—Ramon S. Britts
*Attorney, Agent, or Firm*—Friedman, Goodman & Teitelbaum

[57] ABSTRACT

A reusable wall fastener such as a toggle bolt, which can attach articles to an apertured wall, including a bolt portion with a head and a retaining end thereon, and a captured nut threadingly engaging the bolt between the head and the end. The captured nut includes laterally extending wings or posts which are received in openings in an elongated toggle housing. The toggle housing further includes elongated and transverse apertures for respectively permitting the threading of the bolt both longitudinally and transversely through the housing. A biasing arrangement normally biases the toggle housing in a coaxial orientation with respect to the bolt in order to insert and remove the toggle bolt through the apertured wall. A cam surface on the toggle housing engages the inside face of the wall to thereby pivot the toggle housing against the bias into a position transverse with respect to the bolt so that the housing will engage the inside face of the wall as the bolt is continuously threaded into the housing. A cutting tool is also included which can be coupled to the toggle housing for cutting the aperture in the wall.

12 Claims, 13 Drawing Figures

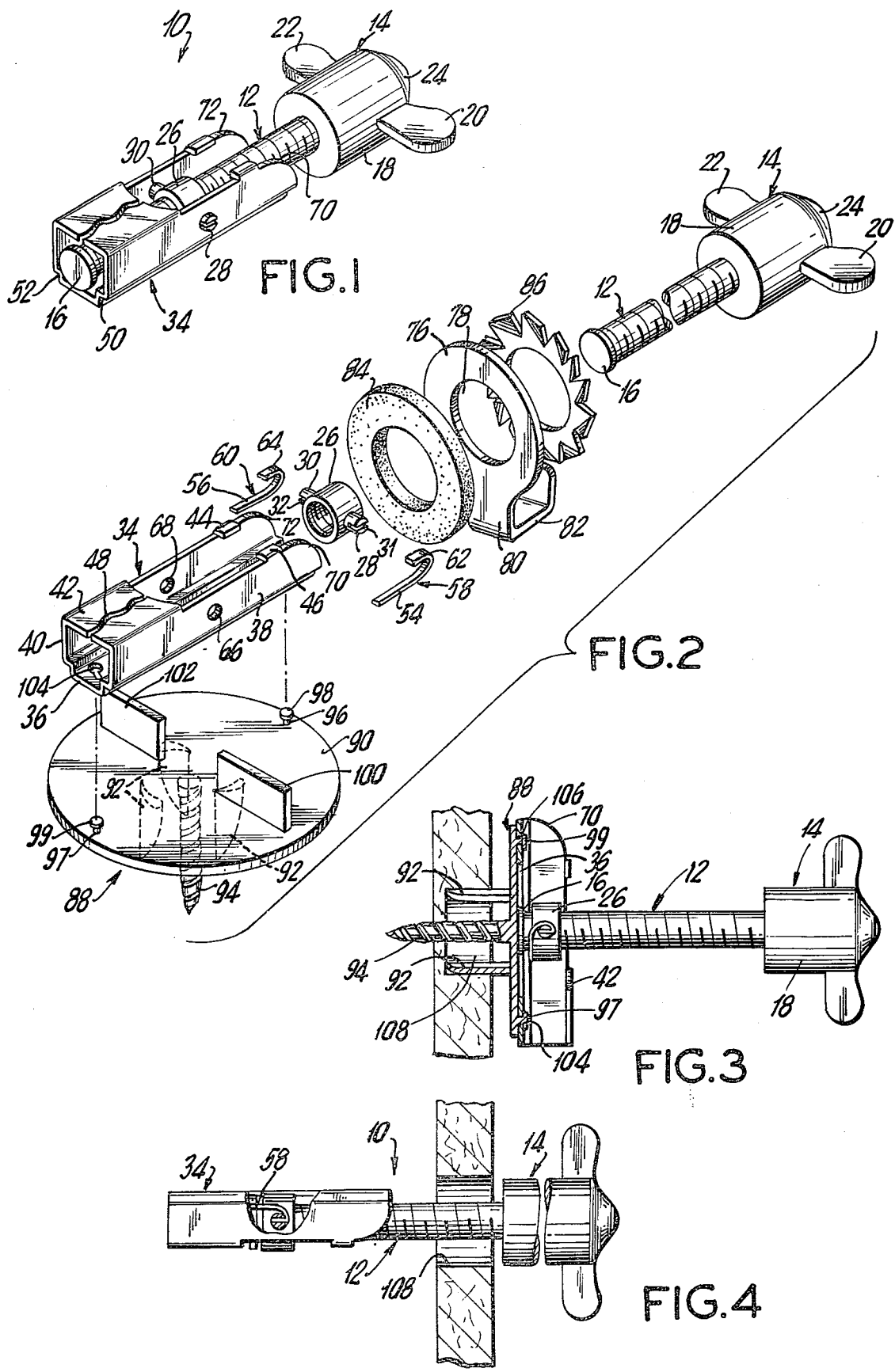

REUSABLE WALL FASTENER

BACKGROUND OF THE INVENTION

This invention relates to fastening members, and more particularly to a wall fastener, such as a toggle bolt, which can attach articles to an apertured wall, and the like, and can be removed for subsequent use.

Wall fasteners, such as toggle bolts, are utilized in connection with an apertured wall where it is desired to attach an article to the wall. Typically, such toggle bolts are utilized with hollow walls so that the space behind the wall can accommodate the toggle mechanism and provide the space for the toggle to pivot in a direction transverse to the axis of the bolt in order to abut the rear surface of the wall.

The standard toggle bolt includes a bolt which passes through an engaging nut which in turn is held at the vertex of V-shaped wings. The wings are spring biased into an open direction. When inserting the toggle bolt, the wings are held closed in order to insert the toggle bolt through the aperture. Once the toggle bolt has been inserted through the wall, the wings are spread apart by the force of the biasing springs. As the bolt is threaded into the receiving nut, the wings are drawn toward the rear surface of the wall and are tightly held in place. The bolt can pass through a hook, or the like, and will securely retain an object attached to the wall.

One problem with such commonly used toggle bolts is that they cannot be reused. In order to withdraw the toggle bolt from the wall, the bolt must be unthreaded, causing the wings to fall into the open space behind the apertured wall. As a result, the wings cannot be extracted through the aperture and the toggle bolt cannot be reused a second time.

Numerous reusable toggle bolts have been suggested in the prior art, however, none of these have been widely accepted because of the limitations therein. For example, U.S. Pat. No. 2,024,871 described a toggle bolt and sleeve arrangement whereby the wings can be threaded into a portion of the sleeve which forces the wings to collapse, and subsequently both the bolt and sleeve can be removed. However, this mechanism requires a special type sleeve whose size must be fitted to the thickness of the wall and accordingly has limited use since numerous sizes therefore must be provided. Furthermore, the requirements of the sleeve increases the cost of the device and the difficulty for its use.

U.S. Pat. No. 2,203,146 describes another type of reusable fastening device which utilizes a spring held toggle housing which is caused to pivot from an inserted position into a locked position by means of a special tool inserted through the spring. Since a special tool is required to insert and remove the toggle device, an individual must retain the tool after the fastening device has been inserted, otherwise he will not be able to later remove the fastening device. Furthermore, the tightness with which the fastening device is held onto the wall depends on the spring force. As a result, with continued use, the spring will stretch and will not hold as tightly. Also, a heavier weighted object will cause the spring to expand further and will thereby not be held as securely to the wall.

A further reusable toggle bolt is described in U.S. Pat. No. 2,224,023, which utilizes a resilient member which flexes in various directions in order to accommodate bending of the wings in a first direction for insertion and in an opposing direction for removal. However, the flexing mechanism thereby is continuously subject to stress failure, must be specially manufactured, and prevents the toggle bolt from being sufficiently tightened in place to hold very heavy articles.

Still a further toggle bolt is described in U.S. Pat. No. 3,127,808, which utilizes the bolt only for insertion and removal of the toggle fastener. A separate threaded holder is required which fits into a sleeve which must be inserted into the wall. The sleeve extends into a toggle housing which pivots due to the force of gravity. As a result, numerous parts are required which makes the device complex. The sleeve must be fitted to the wall thickness and is therefore pre-sized which limits universal use of the fastening device for all types of walls. Furthermore, the inserting and removing bolt must be kept and cannot be lost, otherwise the device will not be able to be removed. Furthermore, it requires gravity to pivot the toggle housing into its locked position, and can therefore only be utilized in conjunction with vertical walls.

Yet another reusable toggle bolt is described in U.S. Pat. No. 4,079,655 which threads a biasing support member onto the bolt and retains the wings unthreaded from the bolt. As the bolt is unthreaded from the wall, the biasing support members are pulled into the aperture which in turn brings the wings together thereby collapsing them so that they can be removed from the wall. However, the biasing support members are continuously deformed and squeezed through the openings and thereby can snap and break apart. Furthermore, it does not provide for a secure connection between the toggle mechanism and the bolt and thereby provides for a device which can be easily broken.

It is therefore evident that although numerous devices have been suggested in the prior art, there is still a need for a suitable removable toggle bolt.

SUMMARY OF THE INVENTION

It is accordingly an object of the present invention to provide a reusable wall fastener which avoids the aforementioned problems of prior art devices.

Still another object of the present invention is to provide a reusable wall fastener which is easy to operate, secure in its holding, and easy to remove.

Yet another object of the present invention is to provide a reusable wall fastener which is reduced in manufacturing cost and yet provides a secure fastening device.

A further object of the present invention is to provide a reusable wall fastener which can fit within different wall thicknesses.

Another object of the present invention is to provide a reusable wall fastener which can include an integral hook portion directly thereon.

A further object of the present invention is to provide a reusable wall fastener which can be connected to a cutting tool for forming an aperture in the wall which will receive a portion of the wall fastener therethrough.

Still another object of the present invention is to provide a combination wall fastener and cutting tool whereby the cutting tool is used to form the aperture which will receive a portion of the wall fastener therethrough.

In accordance with the present invention there is provided a reusable wall fastener, such as a toggle bolt, for attaching articles to an apertured wall and the like. The toggle bolt includes a bolt having a head portion and a retaining end portion. A nut is threadingly engaged onto the bolt between its head and end portions. Laterally extending wings are formed on the nut. The wings are received at approximately the mid section of an elongated toggle housing. Longitudinal and transverse openings are formed in the toggle housing for respectively permitting threading of the bolt both longitudinally and transversely through the housing. A biasing spring is coupled between the toggle housing and the wings in order to bias the toggle housing in a coaxial orientation with the bolt in order to insert and remove the toggle bolt through the apertured wall. A cam surface on the toggle housing is provided for engaging the inside face of the wall to thereby pivot the toggle housing against the biasing spring so as to turn the toggle housing into a position transverse with respect to the bolt. In the transverse position, the housing will engage the inside face of the wall as the bolt is continuously threaded into the wall.

There is also provided in combination with the toggle bolt, a cutting tool for cutting the aperture in the wall. A coupling mechanism is provided for releasably connecting the cutting tool to the toggle housing so that the toggle bolt serves as the operating knob for manipulating the cutting tool.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view of a reusable wall fastener, in the form of a toggle bolt, in accordance with the present invention;

FIG. 2 is an exploded perspective view of the toggle bolt and a cutting tool therefor;

FIG. 3 is a side elevational view, partially in section, showing the first step in the use of the present invention, and specifically the cutting of the aperture in the wall by utilizing the toggle bolt as the operating knob for the cutting tool;

FIG. 4 is a side elevational view, similar to that shown in FIG. 3, showing the next step in the utilization of the toggle bolt, and specifically the insertion of the toggle bolt into the wall wherein the toggle housing is held biased in a coaxial position with the bolt;

In the various figures of the drawings, like reference characters designate like parts.

DETAILED DESCRIPTION OF THE PREFERRED EMBODIMENT

Figure 5:
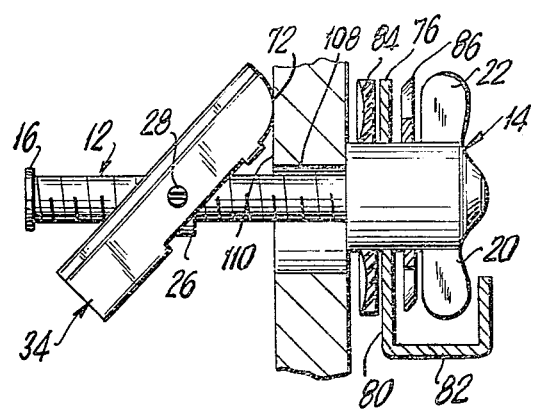
FIG. 5 is a side elevational view, similar to that shown in FIG. 4, and depicting the next step in the utilization of the toggle bolt, and specifically the pulling of the bolt so as to pivot the toggle housing into a transverse relationship with the bolt axis.

Referring now to FIGS. 1 and 2, the reusable wall fastener of the present invention is shown as a toggle bolt 10 and comprises an externally threaded bolt 12 having a head 14 at one end thereof formed as an enlarged wing nut, and an enlarged end cap 16 at the opposite end thereof. The wing nut includes a cylindrical body portion 18, whose diameter is larger than the diameter of the bolt 12, provided with laterally extending wings or arms 20, 22 extending from a forward portion of the wing nut. A conical end 24 is provided at the forward end of the wing nut 14.

The enlarged end cap 16 at the tail end of the bolt is an outwardly extending flange. It prevents complete extraction of the bolt from the housing unit, as will hereinafter be explained.

A nut 26 threadingly engages the bolt and is permitted to travel along the bolt between the head 14 and the enlarged end cap 16. The nut 26 includes laterally extending wings or posts 28, 30 each of which has an axially extending slot 31, 32. After the nut is threaded onto the bolt 12, the tail end of the bolt is flattened to form the end cap 16 so that the nut 26 is captured on the bolt 12.

There is further provided a toggle housing unit 34 which can be stamped in the flat position and bent into the particular configuration shown. The toggle housing 34 includes a base wall 36, upstanding sidewalls 38, 40, and a top wall 42. The top wall is not complete and only includes a portion at the rear end of the housing and the tab portions 44, 46 near the forward end. The wall 42 is shown to have a joint interlock 48 which interconnects the bent sections.

At the junction between the sidewalls 38, 40 and the base wall 36 are provided the shelves 50, 52, for respectively supporting the longitudinal tail or leg portions 54, 56 of the cane shaped biasing springs shown generally at 58 and 60. The hook portions 62, 64, of the biasing springs 58, 60, respectively are received within the axially extending slots 31, 32 of the posts 28, 30 on the nut 26.

Registered holes 66, 68 are provided in the sidewalls 38, 40 to pivotally receive the laterally extending posts 28, 30 on the nut 26.

The rear end of the toggle housing is open. At the forward end, the sidewalls terminate in the curved surfaces 70, 72 which serve as cam surfaces for engaging the inner face of the apertured wall, as will hereinafter be explained.

When assembled, as shown in FIG. 1, the nut is pivotally positioned proximate the midsection of the toggle housing with the posts 28, 30 being securely held within the registered holes 66, 68. The bolt is threaded through the nut 26 and can move axially therethrough. The biasing springs 58, 60 normally maintain the housing 34 in a position coaxial with the bolt, as shown in FIG. 1. In this position, the bolt threadingly moves coaxially through the toggle housing and can extend longitudinally therefrom in one direction until the head portion 14 abuts the toggle housing, and in the opposite direction until the nut 26 abuts the end cap 16.

Figure 10:
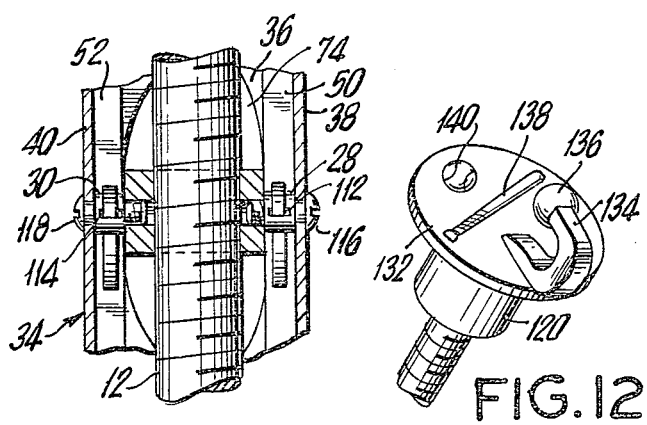
FIG. 10 is an enlarged cut-away view showing the midsection of the toggle housing with the bolt passing therethrough, the apertured base wall of the toggle housing, and showing a further modified nut.

As can best be seen in FIG. 10, a substantially eliptical aperture 74 is formed in the base wall 36. The aperture is such that it will permit the toggle housing to pivot into a transverse position with the bolt passing through the aperture 74, as is shown in FIG. 5 and as will hereinafter be explained.

In order to secure an article to the wall, a washer 76 is included with an inner diameter 78 suitable for passing over the cylindrical body portion 18 of the head 14. A tab 80 downwardly extends from the washer and supports a hook 82 from which can hang an article. A beveled rubber washer 84 is included for preventing the washer 76, which is typically of steel material, from directly scraping the wall. A serrated lock washer 86 is included between the washer 76 and the wings 20, 22 of the head portion 14 in order to lock the washer 76 in place.

In order to make the aperture in the wall for receiving the toggle bolt, there is provided a cutting tool, shown generally at 88. The cutting tool includes a disc 90 having a plurality of teeth 92 extending from a forward surface of the disc. The teeth 92 are equally spaced in an angular direction and lie on a common circle. Also facing in the forward direction is a central pilot screw or threaded pin 94.

Positioned on the opposing side of the disc 90 are locating pins 96, 97 which include enlarged heads 98, 99. There are also provided upwardly extending wings 100, 102 from the rear side of the disc. The wings 100, 102 are spaced apart a sufficient distance to permit the toggle housing 34 to be positioned therebetween.

Keyways 104, 106 are respectively provided on the base wall 36 of the toggle housing, as best shown in FIG. 2, for respectively receiving the locating pins 96, 97 in a bayonet relationship to releasably lock the cutting tool 88 onto the rear of the toggle housing.

The utilization of the toggle bolt and cutting tool will be explained with relationship to FIGS. 3-6. Initially, the bolt 12 is unthreaded to its maximum extent by turning the head 14 in a counterclockwise direction so that the end cap 16 abuts the end face of the nut 26. The cutting tool 88 is then mounted onto the rear surface of the toggle housing and by means of the pins 96, 97, locked in place into the keyways 104, 106. The central pilot screw or pin 94 is then threaded or hammered into the wall at the position desired. Alternately, an initial starting hole can be drilled into the wall and the screw or pin 94 inserted into that hole. The toggle bolt is then turned so that the teeth 92 will cut a suitable aperture 108 into the wall. The aperture is an over-sized opening greater than the diameter of the bolt 12 and approximately the size of the cylindrical body portion 18 of the head. The cutting tool can be rotated by turning the head 14, or the toggle housing 34, or the wings 100, 102 of the cutting tool. The turning is continued until the teeth cut through the entire wall.

Figure 6:
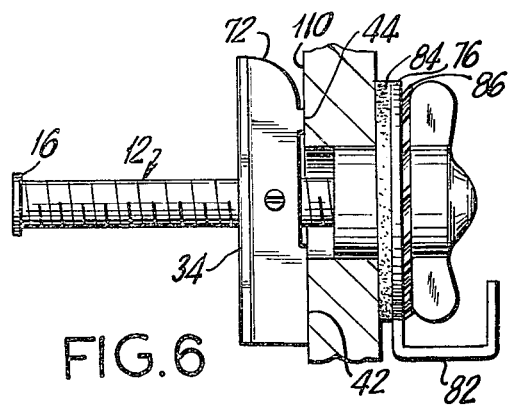
FIG. 6 is a side elevational view, similar to that shown in FIG. 5, and showing the final step in the utilization of the toggle bolt, and specifically the tightening of the bolt so as to securely hold a hook, or the like, in place against the wall.

After the suitable aperture has been made in the wall, the cutting tool is removed from the toggle bolt and the biasing action of the springs 58, 60 will position the toggle housing 34, coaxially with respect to the bolt 12. The toggle bolt 10 is then inserted into the aperture, as shown in FIG. 4. It should be noted that in FIG. 4, the washers 76, 84 and 86 are not shown, however, they can be included if those washers and hook arrangements are being utilized, as indicated in FIGS. 5 and 6.

With the toggle bolt inserted in the wall, the bolt portion is moved upwardly to the top of the aperture 108 and the head 14 is then pulled away from the wall. As the toggle bolt is pulled, the cam surfaces 70, 72 will engage the rear face of the wall 110 and by means of the cam surfaces will cause the toggle housing 34 to pivot about the posts 28, 30 of the nut 26, as shown in FIG. 5, until it reaches a transverse position with respect to the axis of the bolt. The bolt 12 will be pivoted into the aperture 74 in the base wall of the housing 34.

Once the toggle housing 34 is positioned transverse to the bolt 12, the bolt can be tightened by turning the head 14 in a clockwise direction. This will thread the bolt 12 through the nut so that it will extend further from the toggle housing 34 and tighten the toggle housing so that the top wall 42 and the tab portions 44, 46 of the housing abut the rear surface 110 of the apertured wall. In its tightened position, as shown in FIG. 6, the washer 76 will be sandwiched tightly between the lock washer 86 on one side, and the beveled rubber washer 84 on the other side, and will be firmly held in place. A suitable article such as a picture, mirror, or the like, can then be hung on the hook 82 and retained securely to the wall.

In order to remove the toggle bolt, the reverse procedure is followed. Specifically, the head is turned in a counterclockwise direction to unthread the bolt from the nut. This is continued until the end cap 16 hits the nut 26. The toggle bolt is then pushed inwardly so that the toggle housing will move away from the rear surface of the wall and by means of the biasing action of the spring the toggle housing will again orient itself coaxially with respect to the bolt. The arrangement will then appear similar to FIG. 4 and the entire toggle bolt can then be removed through the aperture and reused again.

Although the cutting tool was described as being mounted on the toggle housing, it will be noted that the wings 100, 102 further provide means so that the cutting tool can also be operated manually without the toggle bolt. The cutting tool would then be placed in position on the wall, and would be rotated utilizing the wings 100, 102 as a rotating knob for the cutting tool.

Figure 8:
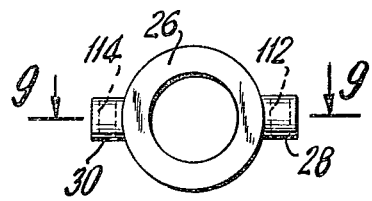
FIG. 8 is a top view of a modified nut which threads onto the bolt.
Figure 7:
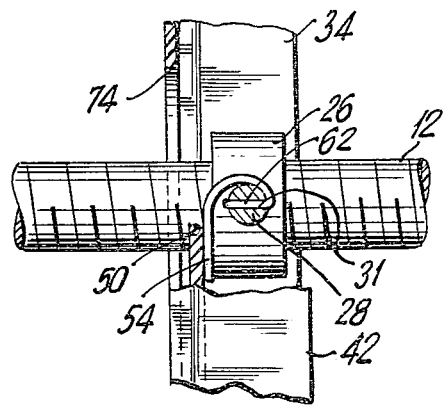
FIG. 7 is an enlarged cut-away view showing the biasing action of the spring when the toggle bolt is in its final position, as shown in FIG. 6.
Figure 9:
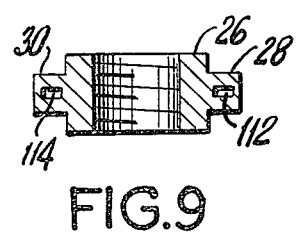
FIG. 9 is a cross-sectional view taken along lines 9—9 of FIG. 8.

Although the nut 26 was heretofore shown as including posts with axially extending slots, alternate arrangements can be had. For example, referring to FIGS. 8 and 9, it will be noted that the posts 28, 30 have transversely extending square holes 112, 114, for accommodating the hook portion of the biasing springs. A further embodiment of the laterally extending posts 28, 30 are as shown in FIG. 10, where in addition to the square slots 112, 114, the posts are axially threaded to receive the locking screws 116, 118 which extend through the openings in the walls 38, 40 of the toggle housing 34.

Figure 11:
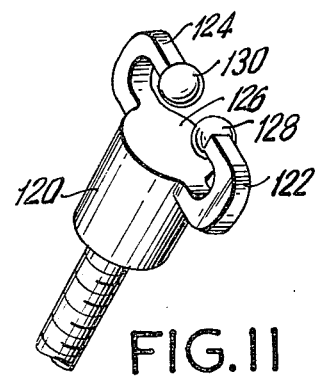
FIGS. 11-13 show modified head arrangements for the bolts.

Instead of utilizing the wing nut head at the end of the bolt, it is possible to use a modified head portion, as shown in FIG. 11 which includes the cylindrical body portion 120 and the surrounding U-shaped arms 122, 124 extending around the head 126 of the cylindrical body and which respectively terminate in the knobs 128, 130. In this way, the hooks are formed integrally with the head portion and articles can be placed directly on these hooks.

Figure 12:
Figure 13:
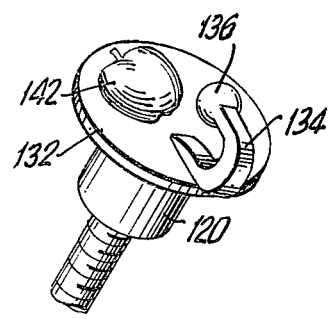

Instead of utilizing a double hook as shown in FIG. 11, a single hook arrangement can be had in connection with a decoration as shown in FIGS. 12 and 13. Specifically, the head portion includes the cylindrical body 120 with a flange 132 at its distal end. A single U-shaped hook 134 extends from the flanged heads which terminates in the knob 136. A decoration is placed on the outer surface of the flange, and is shown as a bat 138 and a ball 140 in FIG. 12. In FIG. 13, it will be noted that the decoration 142 is that of an apple. Other similar decorations could be included as for example a football, a banana, a mug, a flower, a rocket, a shooting star, a baseball, a milk bottle, salt or pepper shakers, a flower pot, or zodiac symbols and the like. These designs could either be flush with the flanged surface or could be protruding therefrom.

It should be noted that the operation of the device is such that the bolt can extend into the toggle housing in both a longitudinal and transverse dirction. When the spring is biasing the toggle housing to make it coaxial with the bolt, threading of the bolt will move it longitudinally through the toggle housing so that it will pass through the open rear end of the housing. When the cam surface abuts the inner surface of the wall to pivot the toggle housing into a transverse direction with respect to the bolt axis, threading of the bolt will cause it to pass transversely through the aperture in the base wall of the toggle housing.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A reusable wall fastener for attaching articles to an apertured wall, and the like, comprising:
   a bolt having head means at one end and retaining end means at an opposite distal end;
   a nut threadingly engaging said bolt between its head means and its retaining end means, said nut including laterally extending wings;
   said retaining end means including an enlarged end cap to prevent removal of said nut from said bolt;
   said head means being secured to said one end of said bolt to capture said nut between said head means and said end cap;
   an elongated toggle housing pivotally receiving said wings of said nut at a midsection of said toggle housing;
   said toggle housing including a rectangular member having a base wall, sidewalls, and at least a portion of a forward wall opposite said base wall, both ends of said rectangular member being open to threadingly receive said bolt longitudinally therethrough, and an aperture provided in said base wall to permit said bolt to pass therethrough as said rectangular member pivots relative to said nut and said bolt engaged by said nut, said aperture further permitting said bolt to be threaded transversely through said toggle housing;
   registered holes extending through said sidewalls of said toggle housing at said midsection for pivotally receiving said wings of said nut securely therein;
   biasing means coupled between said toggle housing and said wings for biasing said toggle housing in a coaxial orientation with respect to said bolt in order to insert said bolt through and remove said bolt from the apertured wall;
   said biasing means including at least one cane shaped biasing spring having an elongated leg portion longitudinally extending against said base wall of said toggle housing and a hook portion engaging an associated one of said wings of said nut; and
   cam means on said toggle housing for engaging an inside face of the apertured wall to thereby pivot said toggle housing against the bias of said spring into a position transverse with respect to said bolt so that said toggle housing will engage the inside face of the apertured wall as the bolt is continuously threaded;
   said cam means including rounded corners on said sidewalls of said toggle housing at a front end of said toggle housing spaced from said portion of said forward wall of said toggle housing.

2. A reusable wall fastener as in claim 1, wherein said biasing means includes two cane shaped biasing springs, each of said springs having an elongated leg portion longitudinally extending in the same direction against said base wall of said toggle housing and a hook portion engaging an associated one of said wings of said nut.

3. A reusable wall fastener as in claim 1, and further comprising a cutting tool for cutting the aperture in the apertured wall, coupling means for releasably connecting said cutting tool to said toggle housing so that said wall fastener serves as an operative knob for manipulating said cutting tool, said cutting tool including a disc provided with forwardly extending teeth equally spaced apart in an angular direction on a common circle, said disc having a forwardly extending pilot screw disposed at the center of said common circle between said teeth, said disc including rearwardly extending locating pins and said toggle housing having keyways in said base wall for receiving said locating pins to define said coupling means.

4. A reusable wall fastener as in claim 2, wherein said base wall of said rectangular member further comprises a longitudinal shelf provided at a junction between each sidewall and the base wall for respectively supporting the elongated leg of each biasing spring.

5. A reusable wall fastener as in claim 2, wherein each of said wings includes a post having an axially extending slot for respectively receiving the hook portion of each biasing spring, said posts extending through said registered holes.

6. A reusable wall fastener as in claim 2, wherein each of said wings includes a post having a transverse aperture therethrough for respectively receiving the hook portion of each biasing spring.

7. A reusable wall fastener as in claim 6, and further comprising axially extending threaded holes in the remote ends of said posts, and fastening screws extending through said registered holes and into said threaded post holes for pivotally securing said posts to the sidewalls of said rectangular member.

8. A reusable wall fastener as in claim 1, wherein said head means comprises an enlarged wing nut having a cylindrical body whose diameter is greater than the diameter of said bolt, and at least one arm laterally extending from a top end of the cylindrical body, said cylindrical body being capable of passing into the aperture in the apertured wall.

9. A reusable wall fastener as in claim 8, and further comprising a washer with a hook depending therefrom, said washer fitting over said cylindrical body whereby as the toggle bolt is tightened into the apertured wall, the cylindrical body will enter the wall aperture and sandwich said washer between the apertured wall and said arm.

10. A reusable wall fastener as in claim 8, wherein there are two of said arms, both of which are hook shaped and extend from the top end of said cylindrical body.

11. A reusable wall fastener as in claim 8, wherein said arm is hook shaped and extends from the top end of said cylindrical body, and further comprising a decorative design extending from the top end of said cylindrical body.

12. A reusable wall fastener as in claim 3, wherein said disc further comprises rearwardly extending wings laterally spaced apart to accommodate said toggle housing therebetween, said disc wings serving as a manual knob for additionally operating said cutting tool.

* * * * *